July 22, 1969  R. L. STONE  3,456,490
DIFFERENTIAL THERMAL ANALYSIS
Original Filed June 2, 1964  2 Sheets-Sheet 1
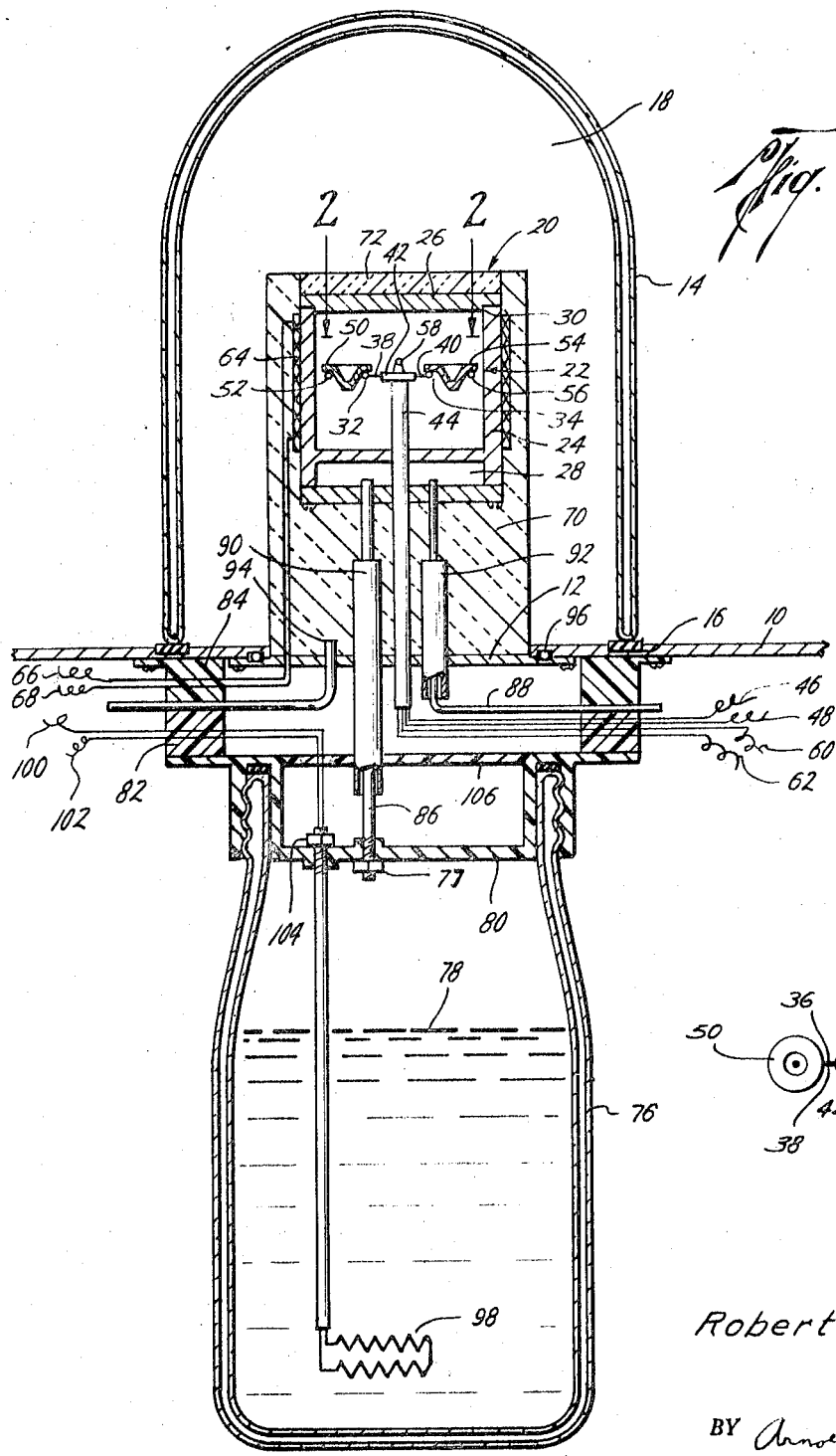
Robert L. Stone
INVENTOR.
BY Arnold and Roylance
ATTORNEYS July 22, 1969 R. L. STONE 3,456,490
DIFFERENTIAL THERMAL ANALYSIS
Original Filed June 2, 1964 2 Sheets-Sheet 2

Robert L. Stone
INVENTOR.
BY Arnold and Roylance
ATTORNEYS

United States Patent Office 3,456,490
Patented July 22, 1969

3,456,490
DIFFERENTIAL THERMAL ANALYSIS
Robert L. Stone, Austin, Tex., assignor, by mesne assignments, to Tracor, Inc., Austin, Tex., a corporation of Texas
Continuation of application Ser. No. 371,988, June 2, 1964. This application Apr. 21, 1967, Ser. No. 632,827
Int. Cl. G01n 25/02
U.S. Cl. 73—15                                   12 Claims

ABSTRACT OF THE DISCLOSURE

Apparatus for differential thermal analysis is cooled by heating a cold liquid to form cold vapors, conveying the cold vapors near the sample to cool the sample, and controlling the cooling rate by controlling the rate of heating the cold liquid.

---

This application is a continuation of application Ser. No. 371,988, filed June 2, 1964.

The invention relates to differential thermal analysis, and particularly concerns improvements for permitting analysis of a sample at temperature below room temperature.

Differential thermal analysis is basically a technique for observing changes in energy level of a sample substance as a function of temperature. The changes may be observed by providing a pair of thermocouples connected in opposing electrical relationship with electrical leads from their other ends, placing a sample substance near one of the thermocouples and a reference substance near the other, heating the sample substance and the reference substance at a programmed rate, and observing the differential voltage developed by the pair of thermocouples. The voltage differential developed is porportional to the changes in energy level of the sample substance different from the changes in energy level of the known or reference substance.

The differential voltages developed may be traced on a chart by conventional techniques to form a record of the differential voltage over the heating range. Usually a standard thermocouple is disposed near the differential thermocouples to indicate the actual temperature around the sample in order to plot on the chart the differential voltage against the actual temperature.

The graphs obtained are characteristic of the sample substance with respect to the reference substance, and may be employed for identification purposes. The graphs are also useful in the determination of the characteristics of a known sample substance, such as melting point, vaporization point, temperature at which a change in crystalline structure occurs, and the like. If a reactive substance or a reactive atmosphere is placed around or sufficiently near the sample substance, the temperature of reaction can also be obtained by the above technique. Further, the magnitude of the differential voltage indicates the heat of reaction.

Although differential thermal analysis is basically a simple technique, there are many difficulties which must be overcome in order to obtain a clear, easily readable graph or chart representative of the characteristics of the sample substance. Obviously, the apparatus for the analysis should be very sensitive and able to detect and convey to the graph minute changes in energy level of the sample substance. The apparatus should be capable of good resolution between closely adjacent thermal loops on the graph in order for the graph to indicate and distinguish among complex series of reactions. The apparatus should also be capable of producing a portrayal of the changes in energy level without spurious loops or wiggles which obscure the actual changes. Drift from the base line representing the reference sample as well as the characteristics of the apparatus should also be minimized. Constructions capable of exhibiting these desirable characteristics are described and claimed in United States applications Ser. No. 365,901, filed May 8, 1964, by Robert L. Stone and Raymond H. Stewart, and Ser. No. 367,692, filed May 15, 1964, now abandoned in favor of application Ser. No. 629,832, filed Apr. 10, 1967; by Robert L. Stone and George T. Burress, now U.S. Patent 3,298,220, which issued January 17, 1967.

The present invention provides methods and apparatus suitable for analyzing a sample at temperatures below room temperature rather than at elevated temperatures, as was conventional heretofore. In that the invention permits study of sample materials over unusual temperature ranges, and in general broadens the applicability of differential thermal analysis, the benefits resulting from the invention will be manifest. In addition, another advantage of the invention is that it provides techniques which permit use at low temperatures of existing designs of apparatus for differential thermal analysis without extensive or costly modification.

One improvement which permits analysis of a sample at temperatures below room temperature, for example, comprises heating a cold material, such as liquid nitrogen or liquid oxygen, to provide a cold vapor; permitting the cold vapor to pass sufficiently near the sample to cool the sample; and controlling the heating rate of the cold material. Thus, by controlling this heating rate the sample can be cooled at a desired rate, for example, a constant rate of temperature decrease, and the sample can be analyzed at low temperatures by differential thermal analysis in accordance with otherwise known procedures.

Apparatus for differential thermal analysis can be modified or improved to permit analysis at low temperatures by the addition of a container for holding a cold material, means for heating the cold material to provide cold vapors, conduit means for conveying the cold vapors sufficiently near the sample to cool the sample, and means for controlling the heating means, thereby permitting control of the rate of temperature decrease in the sample.

Enhanced operation in accordance with the invention can be effected by providing an enclosure means around the sample for permitting reduction or evacuation of the atmosphere in the enclosure means, this reduction in atmosphere insulating the sample and the immediate working area from ambient temperatures as well as eliminating most convection currents therein which tend to cause spurious loops and wiggles in the chart of the changes in energy level. Enhanced operation can also be achieved by providing a sample holder enclosure around the sample as well as the reference material and then contacting the sample holder enclosure but not the sample or the reference material with the cold vapors. This procedure provides a more constant rate of temperature increase or decrease in the sample material or reference material since the mass of the sample holder enclosure minimizes rapid changes and consequently provides a more constant rate of temperature change. Of course, the sample holder enclosure in such a case should be made of thermally conductive material, which as used herein refers to a material or a combination of materials having a resistance to thermal conduction of sufficiently low value to accomplish the intended purpose.

In the drawing:

FIG. 1 is a partially schematic, partially sectional view of an embodiment of an apparatus in accordance with the invention;

FIG. 2 is a view taken along the line 2—2 in FIG. 1; and

Figure 3:
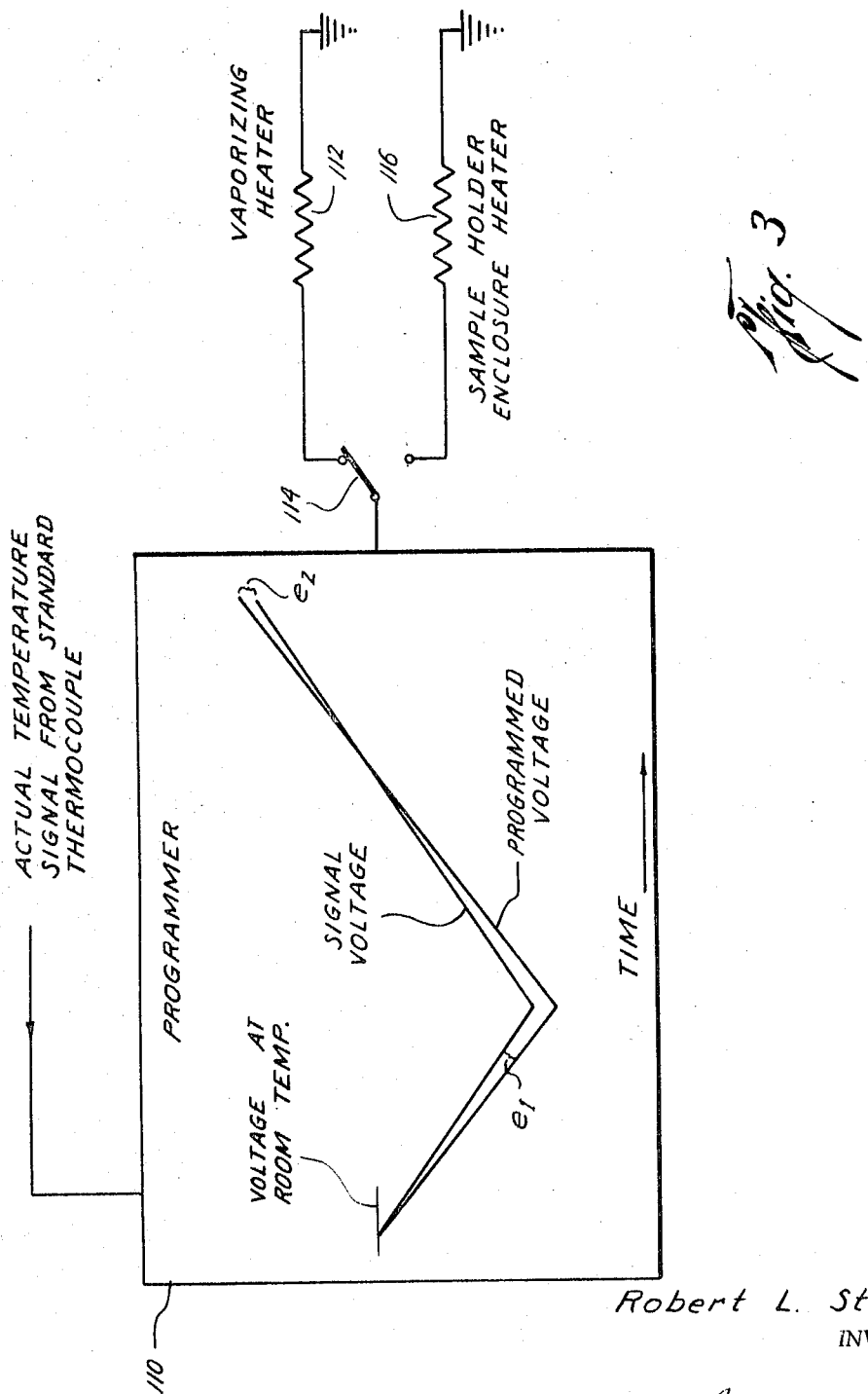
FIG. 3 is a schematic illustration of an electrical circuit suitable for use with the embodiment of the invention shown in FIG. 1.

In FIG. 1, the embodiment of the invention there shown comprises a first support structure 10 connected with a second support structure 12, and a member 14 sealably engageable with the support structure 10 on gasket 16 to define an interior space 18. The member 14 may be a Thermos bottle, Dewar flask, or the like and may be cup-shaped as shown to define in combination with the support structures 10 and 12 an interior space 18. Of course, other suitable enclosure means may be employed. In the interior space 18 is disposed an assembly 20 for holding a sample and a reference material and for permitting a differential voltage to be taken during analysis.

Broadly, the assembly 20 comprises a sample holder enclosure, a pair of thermocouples positioned in the interior of the enclosure, the thermocouples being electrically connected in opposing electrical relationship, and being adapted to be associated with a sample and a reference material respectively, and electrical lead means associated with the thermocouples for permitting measurement of a differential voltage developed during analysis.

Particularly, the assembly 20 comprises a sample holder enclosure 22 comprising a sample holder block 24 and a cap 26 fitting over the open end of the block 24. The block 24 is of cup-shaped configuration and as shown comprises a substantially cylindrical portion and a pair of substantially flat transverse portions to define a cavity 28 therein. The cap 26 as shown is a disk shaped to fit over the block 24. The block 24 and the cap 26 are preferably provided with mating lips, as shown at 30, to hold them in proper relationship.

With reference to both FIG. 1 and FIG. 2, a pair of differentially connected thermocouples having junctions 32 and 34 are positioned in the interior of the enclosure 22 preferably away from the walls thereof. The enclosure 22 may assume various configurations, and the invention is not intended to be limited by the shape of the sample holder enclosure. But it has been found preferable to locate the differentially connected thermocouples away from direct contact with the walls of the enclosure 22 to effect substantially even heat transfer from the walls to the differentially connected thermocouples 32 and 34. The cap 26 and the block 24 in combination are preferably of a configuration which provides substantial symmetry around the thermocouples, although the configuration may be varied somewhat depending on the quality of results expected. For example, a cup-shaped cap with a substantially flat block, a hemispherical cap with a hemispherical block, or a cup-shaped cap fitting over and around a cup-shaped block can provide substantial symmetry around a pair of thermocouples disposed in the interior of the enclosure thus formed. Other constructions, of course, will be apparent to persons skilled in the art.

The junctions 32 and 34 are electrically connected by a wire 36 in opposing electrical relationship with respect to voltage. Wires 38 and 40 from the junctions 32 and 34 pass into an electrically nonconductive tube 44 or other elongated member, and out of the apparatus as electrical lead means 46 and 48. Thus, the differential voltage developed by the opposing junctions 32 and 34 can be read across the electrical lead means 46 and 48.

The electrically nonconductive tubes 42 and 44 are preferably also thermally nonconductive to minimize uneven heat distribution to the junctions 32 and 34, and the interior in general, from the walls of the enclosure 22. As used herein, the term "nonconductive" refers to a resistance of sufficient magnitude to accomplish the intended purpose, and obviously is not intended to refer to an infinite or perfect resistance.

The tubes 42 and 44 contain one or more ducts through which the wires 36, 38, and 40 from the junctions 32 and 34 pass, and the ducts are referably positioned to provide sufficient electrical insulation between wires, although the wires themselves may be provided with insulation when the wires pass through a common duct.

The tubes 42 and 44 provide a means for positioning the thermocouples in the interior of the enclosure 22, although other suitable means may be employed. The nonconductive tube 44 may be held in place by either the block 24, the support structure 12, or other suitable means, taken with friction, adhesives, mechanical holding, and the like, and preferably carries and holds in place the nonconductive tube 42. The wires 38 and 40 passing through the tubes 42 and 44 may be employed to connect and hold the two tubes 42 and 44 together.

A reference sample holder 50 in the form of a shallow cup with an annular rim therearound is disposed on a loop 52 of wire associated with the junction 32, and a test sample holder 54 similar to the reference sample holder 50 is disposed on a loop 56 of wire associated with the junction 34. The loops 52 and 56 and the sample holders 50 and 54 are preferably so shaped that the loops 52 and 56 hold the sample holders 50 and 54 in position against the junctions 32 and 34.

As used herein, the term "sample holder" refers to a container, usually small, which contacts directly a sample or reference material. The term "sample holder enclosure" refers to an enclosure which is larger than required merely to hold a sample or reference material, and which at least in preferred construction does not contact directly a sample or reference material, although in some prior art constructions a pellet of a sample or reference material will be disposed directly on a small portion in the interior of the sample holder enclosure without aid of a sample holder.

A heater 64 of any suitable design is disposed around or near the enclosure 22 and has electrical lead means 66 and 68. A body 70 of thermal insulation is disposed around the enclosure 22, thereby protecting the enclosure 22 from radiation from the support structures 10 and 12, and mates with another body 72 of thermal insulation on the cap 26. As shown, the heater 64 may be carried and held in place by the body 70 of thermal insulation. Of course, any furnace means may be employed to heat the enclosure 22 and its contents as long as it can perform satisfactorily.

Mounted below the support structure 10 is a container 76 for holding a cold material 78, such as liquid nitrogen. As shown, the container 76 may be a Thermos bottle or Dewar flask, but may be of any suitable construction. The container 76 is screwed into a lid 80 suitably made of a plastic material which is held up against mounting rings 82 and 84 by a nut 77 on a gas inlet tube 86. The mounting rings 82 and 84 facilitate assembly and disassembly of the apparatus.

The gas inlet tube 86 communicates with the interior of the container 76 and the cavity 28 to convey cold vapors from the container 76 to the sample holder enclosure 22. A gas outlet tube 88 communicates with the cavity 28 and the outside of the apparatus. The gas inlet and outlet tubes 86 and 88 carry concentrically insulating members 90 and 92 to minimize heat conduction from the support structure 12. The space between the insulating tubes 90 and 92 and the gas inlet and outlet tubes 86 and 88 respectively may be filled with nitrogen or the like or may be under vacuum.

Means for evacuating or reducing the atmosphere in the interior of the enclosure means 14 is provided in the form of an evacuation tube 94. Of course, any spaces between the support structure 12 and the parts which pass therethrough should be suitably sealed with solder or other materials to permit evacuation of the atmosphere in the enclosure member 14. Similarly, an O-ring 96 may be employed between the adjacent surfaces of the support structures 10 and 12.

A heater 98 is disposed in the container 76 to heat and vaporize the cold material 78 therein, and it has electrical lead means 100 and 102. The heater 98 may be held in place by a nut 104. The lid 80 for the container 76 comprises a removable insert 106 to help provide good insulation of the cold material 78 and to facilitate assembly and disassembly.

Thus, differential thermal analysis of a sample material with respect to a reference material both located in the assembly 20 can be obtained at low temperatures by energizing the heater 98, thereby vaporizing the cold material 78 and cooling the sample holder enclosure 22 as well as the sample material and the reference material, and plotting the differential voltage developed across the electrical lead means 46 and 48 against the actual temperature indicated across the electrical lead means 60 and 62 from the standard thermocouple 58. After a predetermined low temperature has been reached, analysis of the sample can be continued by regulating the heater 64, such as by regulating the heater 64 sufficiently to provide a constant rate of temperature increase. The combination of both a cooling means and a heating means permits meaningful analysis from room temperature to a predetermined low temperature and then back to room temperature or as high as the materials of construction will permit.

To obtain a programmed rate of temperature decrease in the enclosure 22 as measured by the standard thermocouple 58, the voltage output across electrical leads 60 and 62 may be employed to control a current source across the electrical leads 100 and 102 in accordance with known techniques. Of course, a lag in the indication by the standard thermocouple 58 must be considered in the design. Furthermore, the differential voltage across the electrical leads 46 and 48 may be first amplified by a suitable means and then led to a chart recorder for portrayal of the changes in energy level in the test sample, all if desired in accordance with known techniques.

An electrical circuit is shown schematically in FIG. 3 which is suitable for programming an analysis of a sample at low temperatures both along a rate of temperature decrease and along a rate of temperature increase. As shown, a signal representative of the actual temperature in the sample holder enclosure is fed to a programmer which can indicate by suitable electrical and/or mechanical procedures a programmed voltage representative of the programmed temperature desired in the sample holder enclosure. As shown, the programmed voltage is compared with the signal voltage, and the lag of the signal voltage with respect to the programmed voltage, which is represented by a differential voltage $e_1$, may be employed to control, or may be amplified to provide, a source of power to a vaporizing heater 112 for vaporizing a cold material for the purposes described hereinbefore. After a predetermined low temperature has been reached and the analysis is to take place over a period of temperature increase, the voltage lag representing the difference between the actual temperature and the programmed temperature will change positions, either after a naturally warming period or a forced warming period, and the signal voltage will then lag the programmed voltage in the opposite direction as shown by the differential voltage $e_2$. At the point the signal voltage crosses the programmed voltage, a switch 114 may be changed manually, electrically, or the like to employ the differential voltage $e_2$ to energize the sample block heater 116 in a suitable manner. At this point the sample block heater 116 must be energized if a substantially constant rate of temperature increase is expected since the actual temperature will otherwise lag the programmed temperature by increasingly large margins. For this reason, even though an apparatus is provided in accordance with the invention for permitting analysis at low temperatures, a heater is preferably provided for heating the sample holder enclosure to permit maintenance of a constant rate of temperature increase therein.

The various parts described above may be made of any suitable material which serves the intended purpose. For example, the sample holder block, cap, and sample holders may be made of copper, aluminum, platinum, other noble metals, ceramics such as aluminum oxide, beryllium oxide, and magnesium oxide, stainless steel, Inconel, and the like depending on existing conditions, although the ceramic materials are not as thermally conductive as the other materials. Copper and aluminum are preferred materials in operation at low temperatures. The thermally insulating materials may be any standard or any other insulating materials, and of course should be located in any necessary places. The nonconductive tubes may be made of any suitable material or materials, for example, aluminum oxide, beryllium oxide, magnesium oxide, other ceramics, and the like. The gas inlet and outlet tubes and the evacuation tube may be made either of thermally conductive or thermally nonconductive materials. The thermocouples are preferably junctions of platinum and an alloy of by weight 90 percent platinum and 10 percent rhodium, but may be made of other suitable materials depending on conditions. For example, junctions of iron and constantan, Chromel and Alumel, or any other materials which when joined produced a thermoelectric effect may be employed.

The electrical leads may be made of any suitable electrically conductive material, and preferably are extensions of the materials forming the thermoelectric junctions to avoid the introduction of additional thermoelectric effects. The reference material is preferably aluminum oxide since it is substantially inert under the ordinary conditions of analysis and since its energy change with respect to change in temperature is substantially linear. The cold material for providing cold vapors may be, for example, liquid nitrogen, liquid oxygen, a liquid hydrocarbon having a suitably low boiling point, Dry Ice, or other suitable materials.

An assembly made in accordance with the above principles may also be useful in apparatus for analyzing a sample with respect to pressure as well as temperature. Thus, if the apparatus contains a means for pressurizing the atmosphere around the sample, the effects of pressure as well as temperature on the changes in energy level can be measured in accordance with procedures described hereinbefore. This technique is a part of the expanding use of the analyzing method referred to generally as differential thermol analysis, and the constructions and procedures described herein are applicable in general to all the variations in this method.

It is also possible in accordance with the invention to provide a reactive or dynamic gas around the sample material as well as the reference material to determine the temperature of reaction at low temperatures as well as an indication of the magnitude of the heat of reaction. Suitable gases, such as oxygen and nitrogen, and the means for introducing the gases around the sample will be apparent to those in the art.

What is claimed is:

1. In a method for analyzing a sample by differential thermal analysis, the improvement for analyzing said sample at temperatures below room temperature comprising placing said sample in a sample holder enclosure made of thermally conductive material, placing said sample holder enclosure in a surrounding enclosure, reducing the atmosphere in said surrounding enclosure, heating a cold material to provide a cold vapor, channeling said cold vapor sufficiently near said sample holder enclosure to cool said sample, controlling the heating rate of said cold material in response to a temperature representative of said sample to provide a substantially constant rate of temperature decrease in said sample to a temperature below room temperature, permitting said sample to warm until the temperature representative of said sample is lower than a predetermined temperature along a desired rate, and then heating said sample holder enclosure sufficiently to raise the temperature of said sample at a substantially constant rate of temperature increase until substantially room temperature is reached.

2. In apparatus for analyzing a sample by differential thermal analysis, said apparatus comprising a sample holder enclosure; a pair of thermocouples positioned in the interior of said sample holder enclosure, said thermocouples being electrically connected in opposing electrical relationship, and being adapted to be associated with a sample and a reference material respectively; and electrical lead means associated with said thermocouples for permitting measurement of a differential voltage developed during analysis; the improvement for permitting analysis at temperatures below room temperature comprising a container for holding a cold material; means for heating said cold material to provide cold vapors; conduit means for conveying said cold vapors to said sample holder enclosure to cool it and consequently said sample and said reference material; means for controlling said means for heating said cold material, thereby permitting control of the rate of temperature decrease in said sample and said reference material; and means for heating said sample holder enclosure, thereby permitting control of the rate of temperature increase in said sample and said reference material, said means for heating said cold material and said means for heating said sample holder enclosure being set apart.

3. The improvement defined in claim 2 wherein said sample holder enclosure has a cavity which communicates with said conduit means and consequently said cold vapors, but which keeps said vapors from direct contact with said sample and said reference material.

4. In apparatus for analyzing a sample by differential thermal analysis, said apparatus comprising a sample holder enclosure; a pair of thermocouples positioned in the interior of said sample holder enclosure, said thermocouples being electrically connected in opposing electrical relationship, and being adapted to be associated with a sample and a reference material respectively; and electrical lead means associated with said thermocouples for permitting measurement of a differential voltage developed during analysis; the improvement for permitting analysis at temperatures below room temperature comprising enclosure means surrounding said sample holder enclosure, thereby permitting reduction of the atmosphere around said sample holder enclosure; a container disposed outside of said enclosure means for holding a cold material; means for heating said cold material to provide cold vapors; conduit means for conveying said cold vapors to said sample holder enclosure to cool it and consequently said sample and said reference material; means for controlling said means for heating said cold material, thereby permitting control of the rate of temperature decrease in said sample and said reference material; and means for heating said sample holder enclosure, thereby permitting control of the rate of temperature increase in said sample and said reference material.

5. The improvement defined in claim 4 wherein said sample holder enclosure has a cavity which communicates with said conduit means and consequently said cold vapors, but which keeps said vapors from direct contact with said sample and said reference material.

6. In apparatus for analyzing a sample by differential thermal analysis, said apparatus comprising a sample holder enclosure; a pair of thermocouples positioned in the interior of said sample holder enclosure, said thermocouples being electrically connected in opposing electrical relationship, and being adapted to be associated with a sample and a reference material respectively; electrical lead means associated with said thermocouples for permitting measurement of a differential voltage developed during analysis; a standard thermocouple positioned near said pair of thermocouples for permitting indication of the actual temperature near said pair of thermocouples; and electrical lead means associated with said standard thermocouple for permitting measurement of said indication; the improvement for permitting analysis at temperatures below room temperature comprising enclosure means surrounding said sample holder enclosure, thereby permitting reduction of the atmosphere around said sample holder enclosure; a container for holding a cold material; means for heating said material to provide cold vapors; conduit means for conveying said cold vapors to said sample holder enclosure to cool it and consequently said sample and reference material; means for controlling said means for heating said cold material, thereby permitting control of the rate of temperature decrease in said sample and said reference material; and means for heating said sample holder enclosure to permit control of the rate of temperature increase in said sample and said reference material; said means for controlling and said means for heating said sample holder enclosure being responsive to said standard thermocouple, said means for heating said cold material and said means for heating said sample holder enclosure being separate.

7. The improvement defined in claim 6 wherein said sample holder enclosure has a cavity which communicates with said conduit means and consequently said cold vapors, but which keeps said vapors from direct contact with said sample and said reference material, and from direct contact with said sample holder enclosure except in said cavity.

8. Apparatus suitable for analyzing a sample by differential thermal analysis at temperatures below room temperature, said apparatus comprising a support structure; a member sealably engageable with said support structure to define an interior space; a sample holder enclosure in said interior space; a pair of thermocouples positioned in the interior of said sample holder enclosure and exposed directly to the walls thereof, said thermocouples being electrically connected in opposing electrical relationship, and being adapted to be associated with a sample and a reference material respectively; electrical lead means associated with said thermocouples for permitting measurement of differential voltage developed during analysis; a standard thermocouple positioned near said pair of thermocouples for indicating the actual temperature near said pair of thermocoupes; electrical lead means associated with said standard thermocouple for permitting measurement of the voltage developed by said standard thermocouple; means for reducing the atmosphere in said interior space; a container for holding a cold material disposed outside of said interior space; means for heating said cold material to provide cold vapors; conduit means for conveying said cold vapors to said sample holder enclosure to cool it and consequently said sample and said reference material; means responsive to said standard thermocouple for controlling said means for heating said cold material, thereby permitting control of the rate of temperature decrease in said sample and said reference material; and within said interior space means responsive to said standard thermocouple for heating said sample holder enclosure, thereby permitting control of the rate of temperature increase in said sample and said reference material.

9. Apparatus for analyzing a sample by differential thermal analysis, said apparatus comprising a sample holder enclosure having interior space for reception of a differential pair of thermocouples and a cavity separate from and incommunicable with said interior space; a differential pair of thermocouples positioned in said interior space of said sample holder enclosure and exposed directly to the walls thereof, said thermocouples being adapted to be associated with a sample and a reference material respectively; a container for holding cold liquid; means for heating the cold liquid to provide cold vapor; conduit means communicating with said container and with said cavity for conveying said cold vapor from said container to said cavity to cool said sample holder enclosure and consequently said sample and said reference material, the interior of said conduit means being incommunicable with said sample holder enclosure except within said cavity; and conduit means communicating with said cavity for permitting said cold vapor to pass out of said cavity.

10. Apparatus for permitting cooling of a sample to temperatures below room temperatures; said apparatus comprising a sample enclosure having first interior space for reception of a sample and having second interior space therein separate from and incommunicable with said first interior space; said first and second interior spaces being separated by a heat conductive portion of the sample enclosure; a container for holding cold material; means for heating the cold material to provide cold vapor; conduit means communicating with said container and with said second interior space for conveying said cold vapor from said container to said second interior space to cool said sample enclosure and consequently said sample, the interior of said conduit means being incommunicable with said sample enclosure except within said second interior space; and conduit means communicating with said second interior space for permitting said cold vapor to pass out of said second interior space; said second interior space being closed except for communication with each of said conduit means.

11. Apparatus as defined in claim 10, including means for heating said sample enclosure and thereby said sample.

12. Apparatus as defined in claim 11, wherein said means for heating includes an electrical resistance heater.

References Cited

UNITED STATES PATENTS

| 2,502,588 | 4/1950 | Preston et al. | 62—1 |
| 3,080,725 | 3/1963 | Cowley et al. | 62—62 |
| 3,092,974 | 6/1963 | Haumann et al. | 62—62 |
| 3,283,560 | 11/1966 | Harden et al. | 73—15 |

OTHER REFERENCES

Mazieres, C.: In Annales De Chimie. vol. T. 6., No. 5–6 pages 584–597, May–June 1961.

RICHARD C. QUEISSER, Primary Examiner

E. D. GILHOOLY, Assistant Examiner

U.S. Cl. X.R.

62—62